Oct. 9, 1973 J. A. BERGERON ET AL 3,764,479
DISK FLOTATION DETERMINATION OF CATALASE ACTIVITY
Filed Sept. 28, 1970
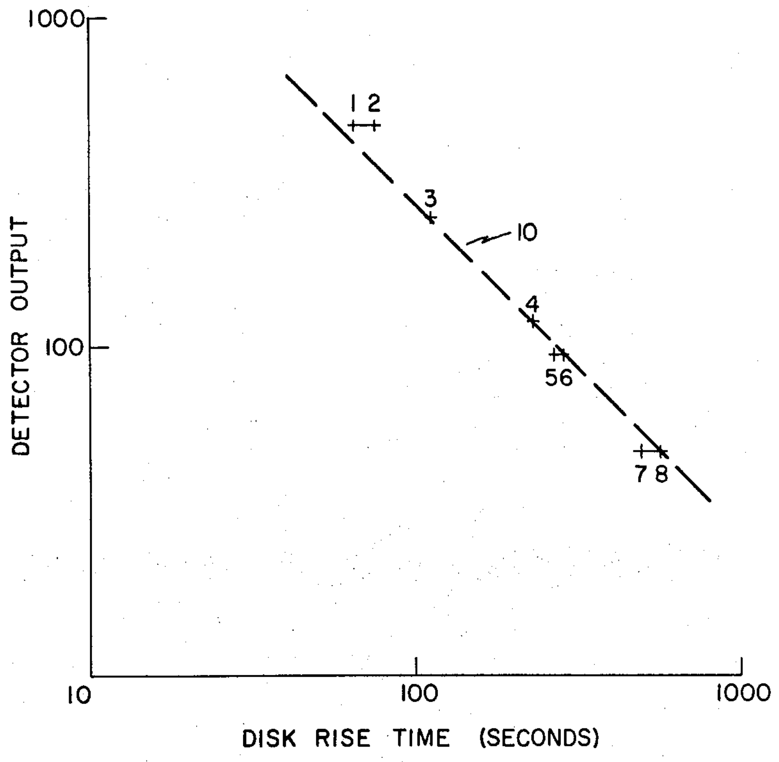
INVENTORS:
JOHN A. BERGERON;
GEORGE M. J. SLUSARCZUK,
by Leo I. MaLossi
THEIR ATTORNEY United States Patent Office 3,764,479

Patented Oct. 9, 1973

3,764,479

DISK FLOTATION DETERMINATION OF CATALASE ACTIVITY

John A. Bergeron and George M. J. Slusarczuk, Schenectady, N.Y., assignors to General Electric Company Filed Sept. 28, 1970, Ser. No. 75,867
Int. Cl. G01n *31/14*
U.S. Cl. 195—103.5 R 4 Claims

ABSTRACT OF THE DISCLOSURE

An inert, wettable (by an aqueous system) bibulous (interconnected pore system) material impregnated with a stable, solid substance able to release hydrogen peroxide upon dissolution thereof in an aqueous system is specifically described for improved response in the quantitative and qualitative determination of catalase by disc flotation. The specific construction described is particularly adapted to quick-screening tests for the detection of bacteriuria and/or renal pathology.

BACKGROUND OF THE INVENTION

It has been proposed to use the detection of catalase in the urine of humans as being an indication of the presence of disease in the urinary tract and/or the presence of kidney injury ("Detection of Urinary Catalase by Disk Flotation"—Braude and Berkowitz, J. Lab. Clin. Med., 57:490 [1961]).

The catalase activity of milk has been used as a detection mechanism for determining the presence of high leucolyte content and the disk flotation method has been proposed as a screening test for the detection of mastitis in milk ("Disk Flotation Tests for Measurement of Catalase Activity in Milk"—Willits and Babel (Dairy Science, v. 48, 1965, pp. 1287–1289)).

The technique employed in both the aforementioned catalase activity measurements by the flotation tests are substantially the same. In the Braude et al. method a disk of pure highly absorbent paper is dipped into a urine sample and then dropped into a test tube. Next, a specific volume of 3% hydrogen peroxide solution is added to the tube and catalase activity is measured by recording the time required (up to one hour) for the disk to rise to the surface of the solution of hydrogen peroxide at room temperature. Flotation of the disk depends upon the liberation of oxygen through the reaction between catalase in the urine and hydrogen peroxide in the test tube. It is stated in the Braude et al. article that "the speed of flotation corresponds directly to the amount of catalase activity."

In the Willits et al. article a paper disk of very pure highly absorbent paper was dipped into a sample of the milk. The disk soaked with milk was dropped into a test tube containing a specific volume of 3% hydrogen peroxide and fell to the bottom of the test tube. As oxygen was liberated from the hydrogen peroxide by the catalase content of the milk, the disk floated to the top of the hydrogen peroxide solution. The time elapsing between the dropping of the disk and the flotation of the disk was recorded.

At least one study into the use of catalase detection by the disk flotation technique as described by Braude et al. has seriously questioned the accuracy of this method ("The Reliability of Screening Tests for Bacteriuria in Pregnancy"—Kincaid-Smith et al., Lancet, 2:61 [1964]) and rejected the catalase test in favor of the triphenyltetrazolium-chloride test, because they were unable to correlate the time taken for the disk to rise to the surface with the bacterial count.

Improvements are, therefore, needed in the materials and/or techniques employed in the conduct of disk flotation catalase detection.

SUMMARY OF THE INVENTION

The invention set forth herein presents an improved disk construction responding to the above-mentioned need by assuring a close approach to zero order reaction inside the disk and achieving effective integration of the gas evolved.

The disks of this invention are made of an inert (free of contaminant capable of catalyzing the decomposition of the $H_2O_2$), wettable (by aqueous solutions), porous (interconnected pore system) material (e.g. filter paper) that has been impregnated with a stable, solid material capable of releasing hydrogen peroxide upon dissolution thereof in water.

In use it is simply necessary to dip the disk in aqueous solution being tested to permit the voids of the disk to fill with sample and then to drop the filled disk into either the aqueous solution being tested for catalase activity or into an inert liquid having a density very closely approaching (but less than) the density of the sample filled disk. Upon being wet the hydrogen peroxide-releasing agent within the disk dissolves releasing $H_2O_2$ which will be decomposed by any catalase present in the solution filling the voids, the bubbles of oxygen gas evolved are in large part trapped inside the porous disk thereby integrating the reaction; the disk is made buoyant in this manner and rises to the surface of the solution.

BRIEF DESCRIPTION OF THE DRAWING

The exact nature of this invention as well as other objects and advantages thereof will be readily apparent from consideration of the following specification relating to the annexed drawing in which a log-log scale graphical illustration (disk rise time vs. catalase activity detected in arbitrary units) is provided showing the very close agreement between test results using the disk of this invention to measure the catalase activity of bacteria in urine with the theoretical slope for a zero order catalase/$H_2O_2$ reaction. The catalase activity for each sample subjected to the disk flotation test was detected using apparatus described in U.S. patent application Ser. No. 886,283—Groves filed Dec. 18, 1969 and assigned to the assignee of the instant invention. The Groves application is incorporated by reference.

DESCRIPTION OF THE PREFERRED EMBODIMENT

The detection device of this invention comprises a small piece of a porous matrix impregnated with a quantity of stable, solid material capable of releasing hydrogen peroxide upon dissolution of the given solid material in water or an aqueous solution. The matrix material must be (a) free of constituents (e.g. metal content) influencing the catalase/hydrogen peroxide reaction; (b) wettable by water or an aqueous solution; (c) have porosity constituting an interconnected system of voids, and (d) have an apparent density such that the matrix when wet with the aqueous solution to be tested will sink in some preselected liquid.

Typical matrix materials are cellulose, glass, plastic, etc. The matrix may constitute fibers of these materials either felted or woven e.g. cotton batting, glass fiber, filter mat etc. or may be made in the form of a sponge. If a non-wetting (to water) material is selected it must be made wettable. In the case of a plastic material, for example, such as polystyrene, sulfonation of the surface will render the plastic wettable by water.

Urea-hydrogen peroxide complex, sodium perborate, sodium carbonate peroxyhydrate, various phosphate peroxyhydrates and acetone hydroperoxide are examples of solid materials that will release hydrogen peroxide upon dissolution thereof in water. Such solid materials or mixtures thereof may be introduced into the porous matrix during manufacture of the matrix or may be introduced into the matrix by impregnation of the completed matrix.

The amount of such solid material introduced into the porous matrix should be large enough so that hydrogen peroxide will evolve therefrom upon dissolution in water in sufficient quantity that in the presence of catalase the hydrogen peroxide/catalase reaction will be saturated. In this manner the reaction (rate of gas evolution) is dependent only on the concentration of the enzyme. This results in approximating a zero order reaction long enough to reach the threshold of buoyancy at which the disk begins to rise.

In the case of urea-hydrogen peroxide complex it was found to be most convenient to prepare a solution as follows to impregnate the disks: add 10 gms. urea to 10 ml. 30% $H_2O_2$. These materials were mixed and warmed gently with stirring at 37–40° C. The resulting solution was saturated (or substantially so) at 37–40° C.

Filter paper disks were prepared either by dipping each disk into the solution to fill the voids or by deposition of the solution on the disks for absorption thereby into the voids. The disks were removed and the drop in temperature of the solution in the disks to room temperature caused urea-hydrogen peroxide complex crystals to deposit within the internal voids of the disks, because of the supersaturation of the solution at room temperature. Prepared disks were permitted to dry and were then ready for use in catalase determinations.

In making the catalase determination it is merely necessary to dip the disk in the liquid sample being tested, e.g. urine sample so as to fill the voids of the porous disk. The disk in this saturated condition constitutes a fixed volume reaction system enabling accurate integration of gas evolution. The reaction system is "fixed" both in the sense of localization of the reaction and attainment of a given volume in which the reaction occurs. In the case of the impregnated filter paper disks used the relative densities of the saturated disk and urine samples were such that when dropped in the urine sample after saturation, the disk sank to the bottom of the container and (if a catalase/$H_2O_2$ reaction occurred) lifted from the bottom in a reasonably short time (about 1–10 minutes) to float to the top.

However, in those instances in which the relative densities of saturated disk and liquid sample are not favorable [e.g. the saturated disk will not sink or the time to reach the threshold of buoyancy is unreasonably long] a different procedure may be used. A second liquid (or solution) inert to the reaction system having low oxygen solubility and a density (or an adjusted density) less than, but approaching, the density of the saturated disk is used for the flotation determination. As soon as the disk has been saturated with the sample fluid it is dropped into the second liquid.

It is preferable in either procedure to use the instant (and incident) of dropping of the saturated disk as time zero, although the time of occurrence of other preselected incidents may be used. In any case the end point of reaction for purposes of this invention is the instant at which the disk becomes buoyant and begins upward movement in the sample (or second) liquid.

Considerable enhancement of sensitivity is achieved by the use of a second liquid as described above for the medium in which the flotation determination is made. By selecting a second liquid or solution having a density close to the density of the saturated disk the time to reach the threshold of buoyancy is shorter, because less $O_2$ gas need be generated to cause the disk to begin to rise. Also, smaller concentrations of enzyme may be detected.

For maximum accuracy in catalase determination the liquid sample being tested should be at a pH in the range of from about 7.5 to about 8.0 and, if necessary, this may be accomplished by the use of a buffer.

In both of the earlier techniques (Braude et al. and Willits et al.) described hereinabove for the detection of catalase by disk flotation, a porous disk soaked with the potential source of catalase activity (the sample or urine or milk, for example) is immersed in the hydrogen peroxide. In each case, from the instant of immersion, competing diffusion phenomena occur, that is, at the same time as the liquid containing the hydrogen peroxide surrounding the disk is trying to diffuse inwardly, the liquid within the disk containing the enzyme is attempting to diffuse outwardly. As a result, much of the reaction between the catalase and the hydrogen peroxide reaction may occur outside of the disk thereby releasing oxygen gas where it will be ineffectual. Such loss prevents effective integration of the gas evolved.

Diffusion loss of reactant and/or oxygen may be substantially eliminated by the use of the disk construction of the instant invention. This advantage follows from the fact that as soon as the disk is saturated with the liquid sample a fixed volume reaction system is created within which dissolution of the $H_2O_2$-emitting solid occurs to provide maximum catalase/$H_2O_2$ reaction inside the disk resulting in the entrapment of evolved oxygen. This optimization of entrapment of the oxygen evolved contributes maximum buoyancy to the disk in the shortest time for more accurate reflection of small catalase concentrations.

The reliability of the relation between time to threshold of buoyancy and catalase activity is illustrated in the drawing. Filter paper disks were used containing crystals of urea-hydrogen peroxide complex in the pores thereof. The samples were a series of dilutions of a sterile urine sample to which a given quantity of bacteria of the genus Serratia was added. Identical samples (a) were subjected to the disk flotation test (time lapse from dropping of the saturated disk to lift from bottom were recorded) and (b) were checked for actual catalase activity using the catalase detector apparatus and procedures described in the aforementioned Groves application. Thus, for each sample 1–8 the time to threshold of buoyancy by the disk flotation test was plotted (log-log scale) as a function of catalase activity in terms of arbitrary units of detector output. All procedures were conducted at room temperature.

A check was made to determine the extent to which a zero-order reaction and integration of evolved gas had been obtained by comparing the log-log plotting of multiple points with a line 10 having a slope of minus one (−1) satisfying the zero-order condition. As may be seen from the drawing, points 1–8 do fall about the theoretical line. This evidence of substantial linearity of response is very pronounced indicating that the two requisite criteria have been met; an approximate zero order reaction up to the threshold of buoyancy and fully effective integration.

Disks prepared of other disk materials and/or using other amounts of the selected solid material (to provide $H_2O_2$) or using different solid materials may be checked for the capability thereof to generate sufficient $H_2O_2$ for a zero-order reaction and of the disk to integrate may be checked by the procedure described in connection with the drawing. Once verification has been made that the theoretical slope is approximated using a specific disk/solid material combination, then this disk construction may be safely used within the stable lifetime of the given solid material and within the range of enzyme activity for which this relationship has been determined.

The use of disk flotation testing according to these teachings is not limited to the detection of catalase by the catalase/$H_2O_2$ reaction, but may be applied to any enzyme reaction that can be assayed manometrically (a reaction in which gas is given off in the system). Expressed another way, whenever an enzyme cleaves a substrate to produce a gas or to produce a reaction product which can displace a gas from some molecule (or ion) present in an aqueous solution, the instant invention may be used to integrate the gaseous output. An example of the latter type system would be used in the detection of cholinesterase. The porous disk would contain a solid mixture of acetylcholine, sodium bicarbonate and sodium carbonate buffer. Upon entry of an aqueous solution containing cholinesterase into a disk, cleavage (hydrolysis) of the acetylcholine would occur producing acetic acid. The acetic acid would react in turn with the sodium bicarbonate to produce gaseous carbon dioxide, which would cause the disk to rise, if sufficient $CO_2$ were generated.

Care must be taken, of course, to assure that the disk material is free of contaminant catalyzing decomposition of the particular substrate present or generated in the porous disk.

What we claim as new and desire to secure by Letters Patent of the United States is:

1. In a method for detecting the presence of a specific enzyme in an aqueous solution, which enzyme is capable of cleaving a given substrate to directly or indirectly produce a gas, the steps comprising:

(a) employing an inert, porous disk containing internally thereof a quantity of a solid substance to provide upon dissolution in an aqueous system sufficient of the requisite substrate to saturate the substrate/enzyme reaction, (b) saturating said disk with aqueous solution containing said enzyme, (c) dropping said saturated disk into a container of a liquid having a density less than the density of said saturated disk and (d) determining the lapse between the time of the occurrence of some preselected incident after disk saturation and the time at which the threshold of buoyancy is attained.

2. The method recited in claim 1 wherein the enzyme is catalase and hydrogen peroxide is the substrate provided by said solid substance.

3. The method recited in claim 2 wherein the solid substance is urea-hydrogen peroxide complex.

4. The method recited in claim 1 wherein the liquid in which the lapse of time is determined is inert to the given reaction system and is different from the aqueous solution used to saturate the disk.

References Cited

UNITED STATES PATENTS

| | | | |
|---|---|---|---|
| 3,447,905 | 6/1969 | Shand | 23—253 TP X |
| 2,905,594 | 9/1959 | Morris | 23—253 TP X |
| 3,138,544 | 6/1964 | Barna et al. | 23—253 TP X |

FOREIGN PATENTS

| | | | |
|---|---|---|---|
| 788,968 | 1/1958 | Great Britain | 424—26 |

OTHER REFERENCES

Dissertation Abstracts, B27(5):1529 (1967).
Chemical Abstracts, 45:400 7a (1951).

LIONEL M. SHAPIRO, Primary Examiner
M. D. HENSLEY, Assistant Examiner

U.S. Cl. X.R.

23—253 TP